United States Patent
Handa et al.

(10) Patent No.: US 9,628,320 B2
(45) Date of Patent: Apr. 18, 2017

(54) INFORMATION PROCESSING APPARATUS, INFORMATION PROCESSING METHOD, COMPUTER PROGRAM, AND INFORMATION COMMUNICATION SYSTEM

(71) Applicant: SONY CORPORATION, Tokyo (JP)

(72) Inventors: Yuji Handa, Kanagawa (JP); Ken Onogi, Tokyo (JP); Takashi Ito, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 710 days.

(21) Appl. No.: 13/909,948

(22) Filed: Jun. 4, 2013

(65) Prior Publication Data
US 2014/0006562 A1 Jan. 2, 2014

(30) Foreign Application Priority Data
Jun. 28, 2012 (JP) .................... 2012-146120

(51) Int. Cl.
H04L 29/08 (2006.01)

(52) U.S. Cl.
CPC .......... H04L 29/0809 (2013.01); H04L 67/02 (2013.01)

(58) Field of Classification Search
CPC .................. H04L 67/148; H04L 29/0809
USPC .......................................... 709/219
See application file for complete search history.

(56) References Cited

U.S. PATENT DOCUMENTS

| 7,343,486 | B1 | 3/2008 | McCarty et al. |
| 9,083,761 | B1* | 7/2015 | Belshe ............... H04L 67/2847 |
| 2002/0002678 | A1* | 1/2002 | Chow .................... G06F 21/31 713/169 |
| 2008/0289029 | A1* | 11/2008 | Kim .................. G06F 17/30905 726/12 |
| 2010/0121657 | A1* | 5/2010 | Rosenberger ........ G06Q 50/24 705/3 |
| 2012/0011259 | A1* | 1/2012 | Balasubramanyan H04L 63/0815 709/228 |

(Continued)

FOREIGN PATENT DOCUMENTS

| JP | 2006-268141 A | 10/2006 |
| JP | 2008-210187 A | 9/2008 |
| JP | 2009-217370 A | 9/2009 |

(Continued)

OTHER PUBLICATIONS

Wikipedia, "Digital Living Network Alliance," Feb. 16, 2010.*

(Continued)

Primary Examiner — Andrew Georgandellis
(74) Attorney, Agent, or Firm — Oblon, McClelland, Maier & Neustadt, L.L.P.

(57) ABSTRACT

There is provided an information processing apparatus including a Web service using unit configured to have a Web browser function supporting a cookie and use a Web service provided by a Web server, a URL acquiring unit configured to acquire a URL to use a Web service in a different device, and a URL transferring unit configured to transfer the URL acquired by the URL acquiring unit to the different device. The URL acquiring unit acquires a one-time URL to make an access request to a Web service requesting authentication, from the Web server.

16 Claims, 9 Drawing Sheets

(56) References Cited

U.S. PATENT DOCUMENTS

2013/0318249 A1* 11/2013 McDonough .......... H04L 67/02
709/228

FOREIGN PATENT DOCUMENTS

JP 2010-288086 A 12/2010
JP 2011/229124 A 11/2011

OTHER PUBLICATIONS

Makoto Okada, "Web API Programming Starting from Basis, Mechanism is Simple, Charm is Infinite," Nikkei Software, Japan, Nikkei BP Corporation, Mar. 24, 2007, vol. 10, No. 5, pp. 26-33. (8 pages).
Office Action issued Apr. 19, 2016 in Japanese Patent Application No. 2012-146120 (with English Translation).
Makoto Okada, "Web API Programming Starting from Basis, Mechanism is Simple, Charm is Infinite," Nikkei Software, Japan, Nikkei BP Corporation, Mar. 24, 2007, vol. 10, No. 5, pgs. 26-33. (8 pages).
Kazuyuki Tasaka et al., "Mounting and Evaluation of Content Collaboration Reproduction Method at Home Network," Lecture Paper Collection (3) of 72th (2010) National Convention as Remembrance of 50 Years from Foundation of Information Processing Society of Japan, Network Security, Japan, (Corporate Juridical Person) Information Processing Society of Japan, Mar. 8, 2010, 5E-3, pp. 3-17-3-18. (2 pages).

* cited by examiner

INFORMATION PROCESSING APPARATUS, INFORMATION PROCESSING METHOD, COMPUTER PROGRAM, AND INFORMATION COMMUNICATION SYSTEM

BACKGROUND

The present disclosure in the specification relates to an information processing apparatus, information processing method, computer program, and information communication system, in which web services requesting authentication are used in homes. Specifically, the present disclosure relates to an information processing apparatus, information processing method, computer program, and information communication system that switch devices using Web services requesting authentication.

Web services that can be used on the Internet include Web services requesting authentication. For example, at the time of using such services from a multifunctional terminal such as a smartphone, the user may perform an input operation of URL (Uniform Resource Locator) or ID and password through a user interface held in the multifunctional terminal, and, after that, it is possible to play content provided by Web services on a screen of the terminal.

Also, there is a case where the user wants to view content, which is viewed on the multifunctional terminal, using a larger screen of a TV set. Most of recent TV sets incorporate a browser function and can display Web services of the multifunctional terminal on the TV set.

However, in the case of using a Web service requesting authentication, the user is requested to input authentication information such as the same ID and password on the TV set side again, which is bothersome. It is troublesome to repeat an input operation of the same character string every time a device to display Web services is switched, regardless of performing the authentication processing once on the multifunctional terminal. Also, an input of the string character in the TV set is normally performed through a numeric key or arrow key of a remote control device, which is a very troublesome operation for the user.

For example, there is suggested a content distribution system in which, at the time of changing a content viewing terminal to view content distributed from a content server requesting login authentication, an original viewing terminal acquires a view right certificate from an authentication management apparatus and transfers it to a destination content viewing terminal and the destination content viewing terminal uses the received view right certificate (assertion) and requests the content to a content providing apparatus (e.g. see Japanese Patent Laid-open No. 2009-217370). According to this content distribution system, the destination content viewing terminal can save the effort of performing login by the destination content viewing terminal. However, in the case of this content distribution system, the view right certificate (i.e. authentication information) is moved at the time of switching a viewing terminal. Therefore, since not only the authentication management apparatus but also the original content viewing terminal and the destination content viewing terminal request a dedicated system to perform authentication information processing, the system becomes large.

SUMMARY

According to a technique disclosed in the specification, for example, there are provided a superior information processing apparatus, information processing method, computer program and information communication system that can switch a device using Web services requesting authentication, by a simple operation on a home network.

According to an embodiment of the present technology, there is provided an information processing apparatus including a Web service using unit configured to have a Web browser function supporting a cookie and use a Web service provided by a Web server, a URL acquiring unit configured to acquire a URL to use a Web service in a different device, and a URL transferring unit configured to transfer the URL acquired by the URL acquiring unit to the different device. The URL acquiring unit acquires a one-time URL to make an access request to a Web service requesting authentication, from the Web server.

The information processing apparatus may further include an inputting unit on which a user performs an input operation of a character. At a time of using a Web service requesting authentication, the Web service using unit may transmit authentication information input by the user though the inputting unit to the Web server by using the Web browser function.

By using the Web browser function, the URL acquiring unit may send a query as to whether the Web service used by the different device requests authentication, to the Web server.

The URL acquiring unit may transmit an HTTP HEAD request with respect to a URL of the Web service and, in a case where a one-time URL issue requestor is included in a header of a response to the HTTP HEAD request, recognize that the Web service requests authentication.

The URL acquiring unit may transmit an HTTP GET request with respect to a one-time URL issue API extracted from the header of the response, and receive a one-time URL as a response to the HTTP GET request.

The URL transferring unit may serve as a digital media controller and a digital media server of DLNA and transmit a URL as "mimetype:text/html" to the different device serving as a digital media renderer.

Further, according to an embodiment of the present technology, there is provided an information processing apparatus including a URL acquiring unit configured to acquire a URL to use a Web service from a different device, and a Web service using unit configured to have a Web browser function supporting a cookie, make an access request to the URL acquired by the URL acquiring unit and use a Web service provided by a Web server. The URL acquiring unit acquires a one-time URL to make an access request to a Web service requesting authentication, from the different device. And the Web service using unit uses the Web service requesting authentication, by using the one-time URL.

In response to reception of a URL as "mimetype:text/html" from the different device serving as a digital media controller and a digital media server, the URL acquiring unit serving as a digital media renderer of DLNA may activate the Web browser function of the Web service using unit and display the received URL.

Further, according to an embodiment of the present technology, there is provided an information processing apparatus including a Web service providing unit configured to provide a Web service, a one-time URL providing unit configured to generate a one-time URL to access a Web service requesting authentication, and transmit the one-time URL to a first device, and a one-time URL storing unit configured to store the one-time URL and session information of the first device as a pair. At a time of receiving a one-time URL from a second device, the Web service providing unit checks the session information stored as one of the pair in the one-time URL storing unit and provides a Web service requesting authentication.

In a case where the first device accesses a Web service requesting authentication, the Web service providing unit may request a user to input authentication information on a Web browser incorporated in the first device, and, in a case where the authentication information is correctly authorized, manage the session information by a cookie.

In a case where an HTTP HEAD request received from the first device is an access request with respect to a URL of a Web service requesting authentication, in response to this, the one-time URL providing unit may transmit a one-time URL issue requestor including a one-time URL issue API and show the first device that the URL is a Web service requesting authentication.

At a time of receiving an HTTP GET request with respect to the one-time URL issue API from the first device, the one-time URL providing unit may check that the first device is already authorized, generate a one-time URL with respect to the Web service requesting authentication, and transmit the one-time URL as a response to the HTTP GET request.

In a case where the second device accesses the one-time URL, based on the session information stored as one of the pair in the one-time URL storing unit, the Web service providing unit may take that the second device logs in with same authentication information as the first device, and transmit a cookie to manage the session information to the second device and start a new session.

The Web service providing unit may discard the one-time URL accessed by the second device and the session information as one of the pair, from the one-time URL storing unit.

Further, according to an embodiment of the present technology, there is provided an information processing method including using a Web service provided by a Web server, acquiring a URL to use a Web service in a different device, and transferring the URL acquired in the URL acquiring step to the different device. In the URL acquiring step, a one-time URL to make an access request to a Web service requesting authentication is acquired from the Web server.

Further, according to an embodiment of the present technology, there is provided an information processing method including acquiring a URL to use a Web service from a different device, and making an access request to the URL acquired in the URL acquiring step and using a Web service provided by a Web server. In the URL acquiring step, a one-time URL to make an access request to a Web service requesting authentication is acquired from the different device. And, in the Web service using step, the Web service requesting authentication is used by using the one-time URL.

Further, according to an embodiment of the present technology, there is provided an information processing method including providing a Web service, generating a one-time URL to access a Web service requesting authentication, and transmitting the one-time URL to a first device, and storing the one-time URL and session information of the first device as a pair. In the Web service providing step, at a time of receiving a one-time URL from a second device, the session information stored as one of the pair in the one-time URL storing step is checked and a Web service requesting authentication is provided.

Further, according to an embodiment of the present technology, there is provided a computer program written in a computer-readable format to cause a computer to function as a Web service using unit configured to have a Web browser function supporting a cookie and use a Web service provided by a Web server, a URL acquiring unit configured to acquire a URL to use a Web service in a different device, and a URL transferring unit configured to transfer the URL acquired by the URL acquiring unit to the different device. The URL acquiring unit acquires a one-time URL to make an access request to a Web service requesting authentication, from the Web server.

Further, according to an embodiment of the present technology, there is provided a computer program written in a computer-readable format to cause a computer to function as a URL acquiring unit configured to acquire a URL to use a Web service from a different device, and a Web service using unit configured to have a Web browser function supporting a cookie, make an access request to the URL acquired by the URL acquiring unit and use a Web service provided by a Web server. The URL acquiring unit acquires a one-time URL to make an access request to a Web service requesting authentication, from the different device. And the Web service using unit uses the Web service requesting authentication, by using the one-time URL.

A computer program according to an embodiment of the present disclosure defines a computer program described in a computer-readable format such that predetermined processing is realized on a computer. In other words, by installing the computer program according to the embodiment of the present disclosure in the computer, a coactive operation is exerted on the computer and it is possible to acquire the same operational effect as an information processing apparatus according to an embodiment of the present disclosure.

Further, according to an embodiment of the present technology, there is provided an information communication system including a first device having a web browser function, a second device having a web browser function, and a Web server providing a Web service in a case where a URL is accessed. The Web server issues a one-time URL to access a Web service requesting authentication, to an authorized device, and stores the one-time URL and session information of the device as a pair. The first device transmits authentication information to the Web server through the Web browser function, acquires the one-time URL, and transfers the one-time URL to the second device. And the second device accesses the Web service requesting authentication by the received one-time URL.

However, the "system" herein denotes a logical aggregation of multiple apparatuses (or functional modules to realize a specific function) and it does not matter whether the apparatuses or functional modules are included in a single chassis.

According to a technique disclosed in the specification, for example, it is possible to provide a superior information processing apparatus, information processing method, computer program and information communication system that can save the effort of repeat login and switch a device using Web services requesting authentication on a home network.

Also, according to a technique disclosed in the specification, it is possible to provide a superior information processing apparatus, information processing method, computer program and information communication system that can switch a device using Web services requesting authentication without exchanging authentication information on a home network.

Other objects, features and advantages of the technique disclosed in the specification are clarified by detailed explanation based on embodiments and appended drawings described below.

DETAILED DESCRIPTION OF THE EMBODIMENTS

Figure 1:
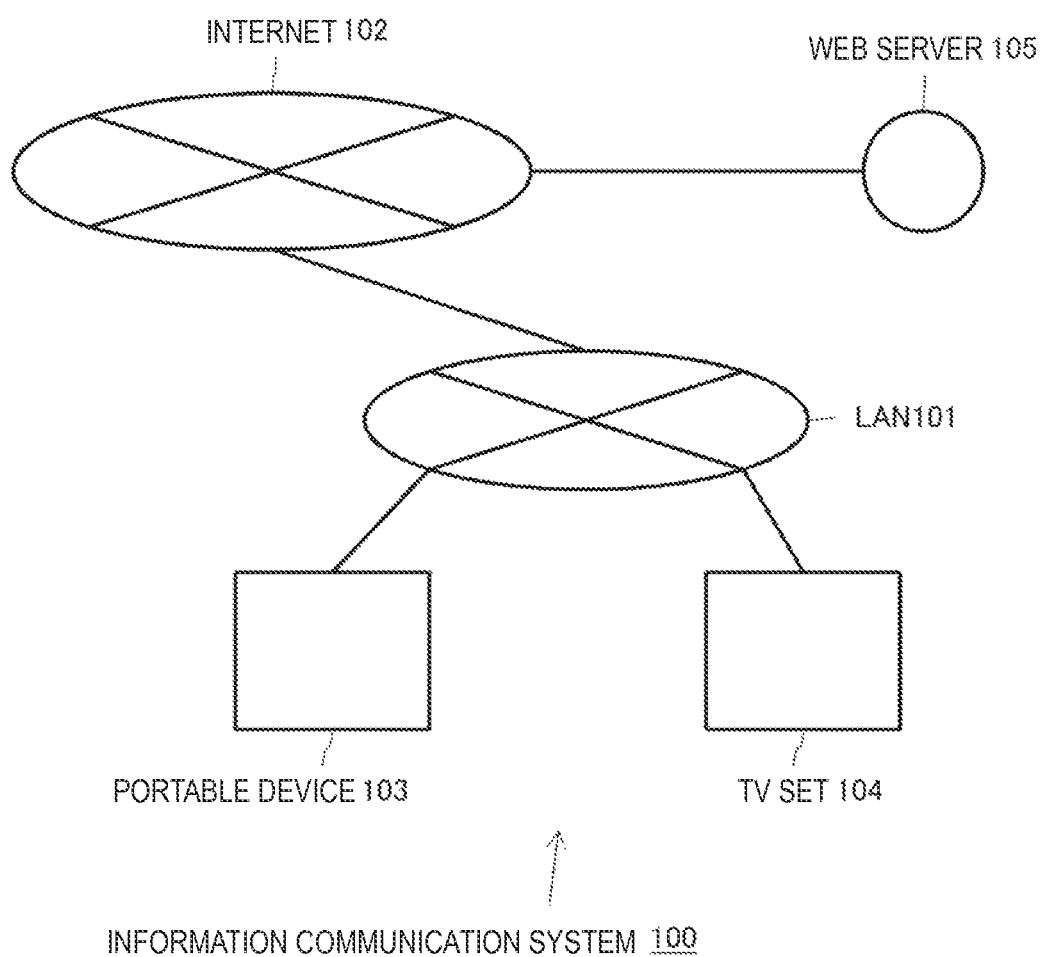
FIG. 1 is a diagram schematically illustrating a configuration of an information communication system 100 to which a technique disclosed in the specification is applied.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In the following, embodiments of a technique disclosed in the specification are explained in detail with reference to the drawings.

FIG. 1 is a diagram schematically illustrating a configuration of the information communication system 100 to which a technique disclosed in the specification is applied.

On Internet 102, an endless number of hosts (not illustrated) including the Web server 105 are set. In the present embodiment, the Web server 105 provides Web services requesting authentication, on the Internet 102. An example of the Web services is streaming of moving image content.

Also, an endless number of networks (not illustrated) including a LAN (Local Area Network) 101 are mutually connected to the Internet 102.

The LAN 101 is installed in, for example, a home. Also, in the home, there are provided devices incorporating Web browsers connectable to the LAN 101 and the Internet 102, such as the TV set 104 and the portable device 103 including a smartphone, and it is possible to use Web services such as moving image streaming provided by the Web server 105, from the devices. The Web browsers incorporated in the portable device 103 and the TV set 104 correspond to cookies.

In the LAN 101, as a system to operate AV content via an IP (Internet Protocol) network in the home, for example, the DLNA (Digital Living Network Alliance) guideline is installed. Here, the DLNA guideline 1.0 (and 1.5) defines connection conditions of 2-box pull system usage including a DMS (Digital Media Server) corresponding to a server to provide content and a DMP (Digital Media Player) corresponding to a client to play it. Also, the DLNA guideline 1.5 defines 3-box system usage including a DMR (Digital Media Renderer) and a DMC (Digital Media Controller), and the client can operate the DMC, transmit content from the DMS to the DMR and play it.

When the system of the DLNA guideline is applied to the information communication system 100 illustrated in FIG. 1, there is assumed an operation in which the portable device 103 serves as the DMC and the DMS, the TV set 104 serves as the DMR and AV content is played on the TV set 104.

For example, when a Web service used in the portable device 103 is requested to be displayed on a large screen of the TV set 104, the portable device 103 as the DMC and the DMS may perform DLNA push of URL to access the Web service, to the TV set 104 as the DMR. Here, at the time of using a Web service requesting authentication, the portable device 103 transmits authentication information such as an ID and password input by the user on the Web browser, to the Web server 105, and the Web server 105 performs authentication processing. Also, the Web server 105 issues a one-time URL to access a Web service, to the authorized portable device 103, and stores it and session information of the portable device 103 as a pair. Therefore, when the portable device 103 gives the one-time URL to the TV set 104, by accessing this one-time URL, the TV set 104 can take over the authentication state and use the same Web service without inputting the authentication information again.

First, an explanation is given to a case where a Web service, which requests authentication and is provided in the Web server 105, is used on the LAN 101.

First, the user inputs an URL of the Web service provided by the Web server 105, in a Web browser on the portable device 103. At this time, the Web server 105 requests authentication for use of the Web service and displays a screen to request the user to input an ID and password, on the Web browser. In response to this, when the user uses an UI (User Interface) such as a button and touch panel held in the portable device 103 and correctly inputs authentication information including the ID and the password, it is transmitted from the Web browser to the Web server 105. Subsequently, the Web server 105 performs authentication processing of the user or the portable device 103 using the received ID and password, and, if the authentication succeeds, displays a screen to provide the Web service on the Web browser.

Figure 2:
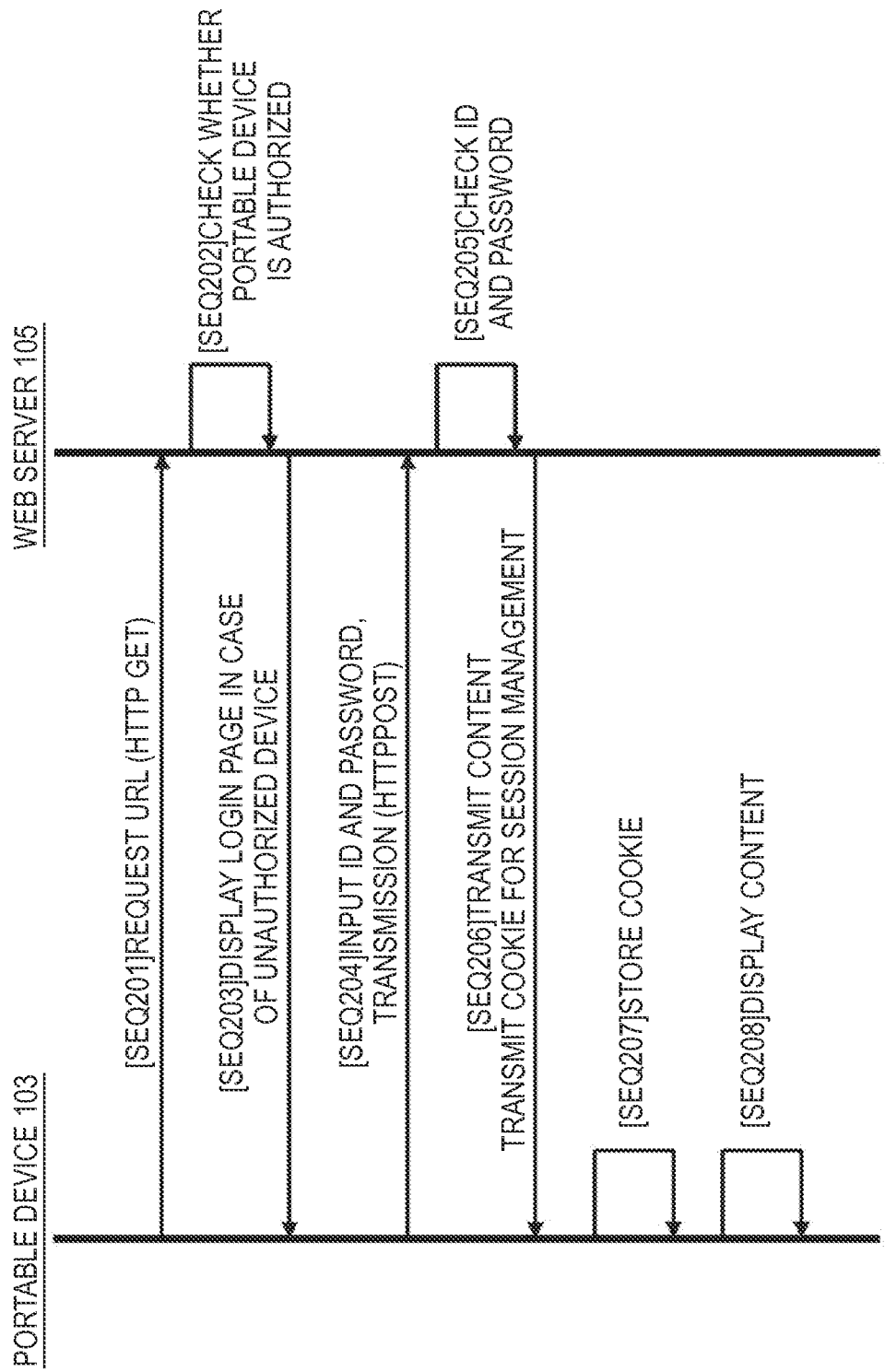
FIG. 2 is a diagram illustrating a communication sequence example where a Web server 105 authorizes a portable device 103.

FIG. 2 illustrates a communication sequence example where the Web server 105 authorizes the portable device 103 when the portable device 103 uses a Web service requesting authentication.

The portable device 103 requests an URL input in the Web browser to the Web server 105 (SEQ 201). This request is performed using, for example, an HTTP (Hyper Text Transfer Protocol) GET message. Here, it is assumed that the requested URL is a Web service requesting authentication.

When receiving the request from the portable device 103, the Web server 105 checks whether the portable device 103 is authorized (SEQ 202). Subsequently, when the portable device 103 is not authorized yet, the Web server 105 displays a screen to request the user to input an ID and password, on the Web browser (SEQ 203).

On the side of the portable device 103, when the user inputs a correct ID and password, for example, it is transmitted from the Web browser to the Web server 105 using an HTTP POST message (SEQ 204). In response to this, the Web server 105 checks the received ID and password and performs authentication processing of the user or the portable device 103 (SEQ 205).

Here, if the authentication succeeds, the Web server 105 generates a cookie to manage a login session with the portable device 103, links this with user information and manages these. Further, the Web server 105 inserts the cookie in the header of a response to the HTTP POST message and transmits content to the portable device 103 (SEQ 206).

The portable device 103 stores the cookie received from the Web server 105 (SEQ 207). After that, by inserting the cookie in the head part of a request to the Web server 105 and transmitting it, the portable device 103 can deal with the Web server 105 while maintaining a connection state of the login session. Subsequently, on the side of the portable device 103, the content received by the Web browser from the Web server 105 is displayed (SEQ 208).

After that, it is assumed that the user wants to view the content, which is viewed on the portable device 103, using a larger screen of the TV set 104. In such a case, the user performs an operation of transmitting the URL of the content displayed on the portable device 103 to the TV set 104.

When the URL transmission operation for other devices such as the TV set 104 is performed by the user, the portable device 103 transmits an HTTP HEAD request with respect to the URL to be displayed on the TV set 104, to the Web server 105.

Here, although a response to the HTTP HEAD request does not include a message body, other responses are equivalent to those to the HTTP GET request, and it is often used to acquire additional information with respect to the request. For example, although requested content itself is cached in the portable device 103, the HTTP HEAD request is transmitted at the time of checking whether the content is updated.

When receiving the HTTP HEAD request, the Web server 105 checks whether authentication is requested to display the requested URL. Subsequently, in a case where the authentication is requested, it returns a response in which a one-time URL issue requestor shown in following table is attached into the header, to the portable device 103.

| HTTP header | X-OneTimeURL: http://a.b.c/onetimeurl?url=http://a/b/c/xyz.html |
|---|---|

The one-time URL issue requestor shown in the above table is formed with a combination of: the value (X-OneTimeURLIssuer) showing that the response header is a one-time URL issue requestor; and a character string (http://a.b.c/onetimeurl?url=http://a.b.c/xyz.html) of an API (Application Programming Interface) to request an issue of the one-time URL. For example, the URL of a Web service requesting authentication is "http://a.b.c/xyz.html" and an issue request of a one-time URL with respect to that URL is represented by http://a.b.c/onetimeurl?url=http://a.b.c/xyz.html.

Here, the one-time URL is an URL with an expiration date with respect to a resource for which the Web server 105 accepts an HTTP GET request only once (or in a limited time or number). The above one-time URL issue API is an API to request, to the Web server 105, a one-time URL to access an URL requesting authentication. The Web server 105 discards the issued one-time URL in a case where a certain period of time elapses or the number of accesses is one (or predetermined number).

When receiving a response to the HTTP HEAD request from the Web server 105, the portable device 103 checks whether the header includes a one-time URL issue requestor (X-OneTimeURLIssuer).

In a case where this response header does not include the one-time URL issue requestor, it is interpreted that the Web service requested by the HTTP HEAD request does not request authentication. Therefore, the portable device 103 may transmit the URL to be displayed on the TV set 104 (without requesting a generation of the one-time URL) as is to the TV set 104.

Meanwhile, in a case where the response header includes the one-time URL issue requestor (i.e. in a case where the header includes a character string "X-OneTimeURLIssuer"), it is interpreted that the Web service requested by the HTTP HEAD request requests authentication and the Web server 105 has issued the one-time URL issue API. In this case, the portable device 103 regards the value (http://a.b.c/onetimeurl?url=http://a.b.c/xyz.html) set in the header as the one-time URL issue API and transmits an HTTP GET request for the URL to the Web server 105.

When receiving this HTTP GET request, the Web server 105 checks an authentication state of the portable device 103 of the transmission source. The portable device 103 inserts a cookie acquired in an authentication sequence, in the header part, and transmits the HTTP GET request. Also, the Web server 105 links the cookie generated in the authentication sequence with user information and manages these (as described above). Therefore, the Web server 105 can check the authentication state of the portable device 103 based on the cookie extracted from the header of the HTTP GET request.

When finding that the portable device 103 is authorized, after generating the one-time URL requested be issued, the Web server 105 transmits, to the portable device 103, a response to the HTTP GET request including the one-time URL as a message body. Meanwhile, in a case where the portable device 103 is not authorized, the Web server 105 returns an error message "401 Unauthorized." Subsequently, in response to this error message, the portable device 103 cancels processing of displaying content of the URL on other devices such as the TV set 104.

In the parameters of the one-time URL issue API (see Table 1), an URL (in this example, "http://a.b.c/xyz.html") indicating content to be displayed on the TV set 104 by the portable device 103 is designated. Authentication is not requested to access the one-time URL generated from the parameter designated in the one-time URL issue API. At this time, to turn over session information (i.e. authentication state) of the portable device 103 to the TV set 104 through the one-time URL, the Web server 105 temporarily stores this one-time URL and the session information as a pair. At the timing the one-time URL becomes invalid, the Web server 105 discards the pair of the one-time URL and the session information.

The portable device 103 extracts the message boy from the response received from the Web server 105, specifies an URL to be transmitted to the TV set 104 and transmits it to the TV set 104.

Figure 3:
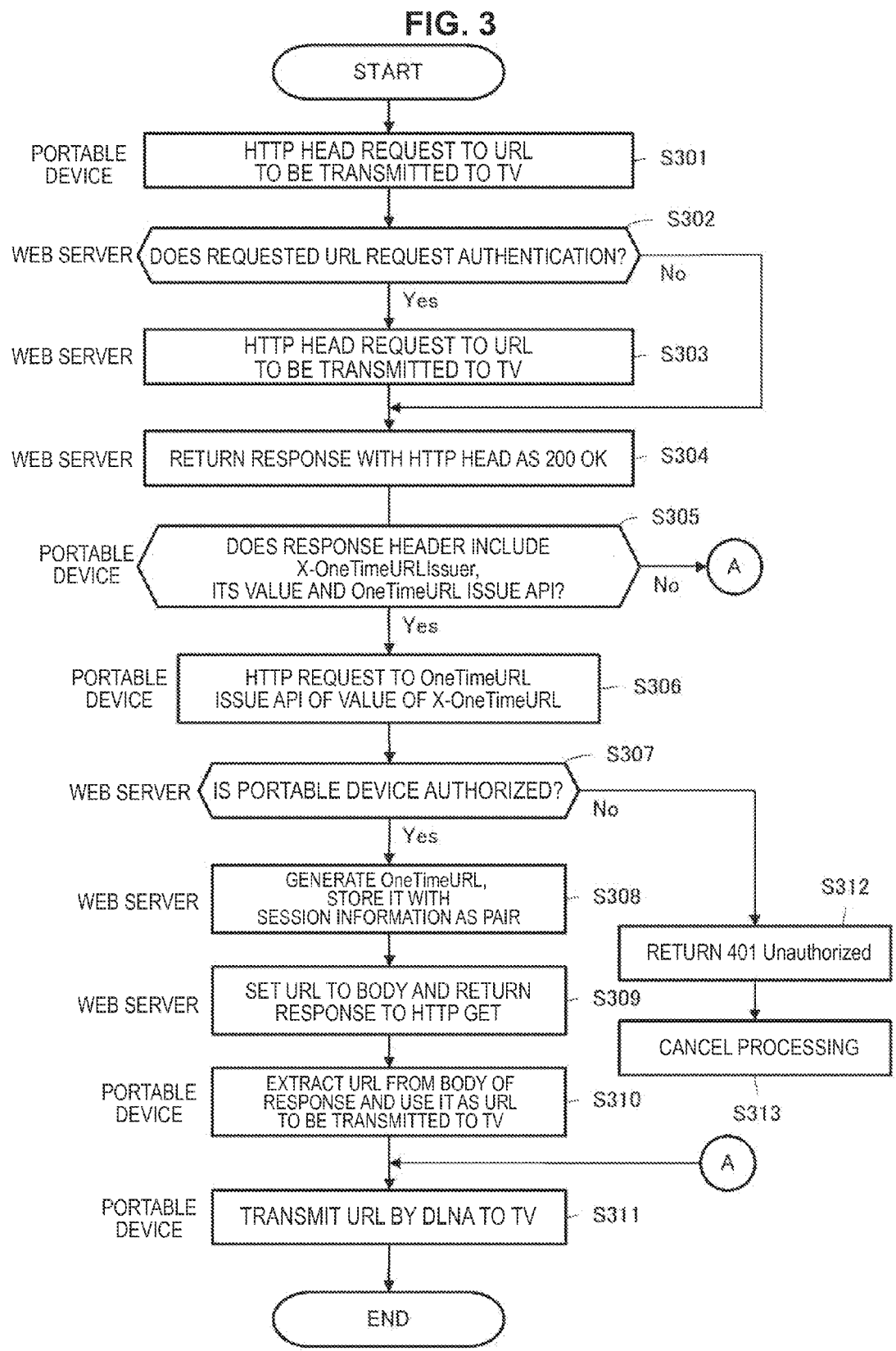
FIG. 3 is a flowchart illustrating a procedure of processing performed by the information communication system 100 before the portable device 103 acquires a one-time URL from the Web server 105 and transmits it to a TV set 104.

FIG. 3 illustrates a procedure of processing performed by the information communication system 100 from when the portable device 103 acquires a one-time URL from the Web server 105 to when the portable device 103 transmits it to the TV set 104, in a flowchart format.

First, the portable device 103 transmits, to the Web server 105, an HTTP HEAD request to a URL to be displayed on the TV set 104 (step S301). For example, in response to a URL transmission operation performed for other devices such as the TV set 104 by the user, transmission processing of an HTTP HEAD request is activated.

The Web server 105 checks whether authentication is requested to display the URL requested by the HTTP HEAD request (step S302).

Here, in a case where a URL not requesting authentication is requested ("No" in step S302), the Web server 105 attaches a status "200 OK" to the header part and returns a response to the HTTP HEAD request, to the portable device 103 (step S304).

Also, in a case where a URL requesting authentication is requested ("Yes" in step S302), the Web server 105 sets a combination of a value (X-OneTimeURLIssuer) indicating a one-time URL issue requestor and a character string (http://a.b.c/onetimeurl?url=http://a.b.c/xyz.html) of an API (Application Programming Interface) to request an issue of a one-time URL, to the header part (step S303), and returns a response to the HTTP HEAD request, to the portable device 103 (step S304).

The portable device 103 checks whether the header of the response received from the Web server 105 includes the one-time URL issue requestor (X-OneTimeURLIssuer) (step S305).

Here, in a case where the response header does not include the one-time URL issue requestor ("No" in step S305), the portable device 103 transmits the URL to be displayed on the TV set 104 as is to the TV set 104 (step S311).

Meanwhile, in a case where the response header includes the one-time URL issue requestor ("Yes" in step S305), the portable device 103 can recognize it as a URL requesting authentication. In this case, the portable device 103 regards the value (http://a.b.c/onetimeurl?url=http://a.b.c/xyz.html) set in the header as the one-time URL issue API and transmits an HTTP GET request to the URL to the Web server 105 (step S306).

When receiving this HTTP GET request, the Web server 105 checks an authentication state of the portable device 103 of the transmission source (step S307). A cookie is attached to the header of the HTTP GET request and the Web server 105 can check the authentication state of the portable device 103 based on user information linked with the cookie.

Here, in a case where the portable device 103 is not authorized ("No" in step S307), the Web server 105 returns an error message "401 Unauthorized" (step S312). Subsequently, in response to this error message, the portable device 103 cancels processing of displaying content of the URL on the TV set 104 (step S313), and the processing routine is over.

Meanwhile, when it is found that the portable device 103 is authorized ("Yes" in step S307), the Web server 105 generates the one-time URL requested to be issued and temporarily stores this and session information as a pair (step S308). Also, the Web server 105 transmits, to the portable device 103, a response to the HTTP GET request using the generated one-time URL as a message body (step S309).

When the portable device 103 extracts the message body from the response received from the Web server 105 and specifies a URL to be transmitted to the TV set 104 (step S310), the portable device 103 transmits the URL to the TV set 104 (step S311). In step S311, although the portable device 103 transmits the one-time URL to the TV set 104 by DLNA push and activates a Web browser on the TV set 104, this point is described below in detail.

Figure 4:
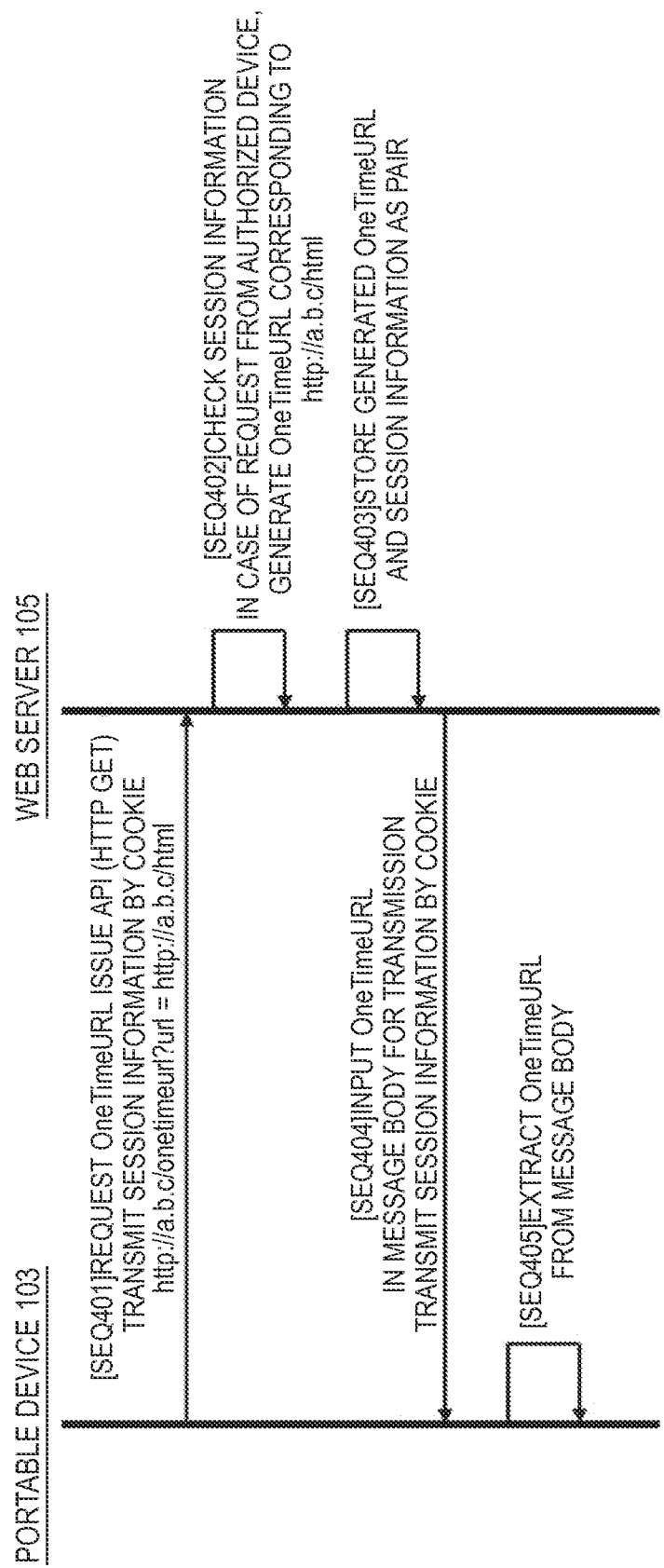
FIG. 4 is a diagram illustrating a communication sequence example where the portable device 103 acquires a one-time URL from the Web server 105.

FIG. 4 illustrates a communication sequence example where the portable device 103 acquires a one-time URL from the Web server 105.

The portable device 103 requests a one-time URL issue API by HTTP GET (SEQ 401). At this time, by including a cookie in the header of the HTTP GET request, session information is transmitted.

When receiving this HTTP GET request, the Web server 105 checks an authentication state of the portable device 103 of the transmission source based on user information linked with the cookie. Subsequently, when finding that the portable device 103 is authorized, the Web server 105 generates a one-time URL corresponding to a URL (http://a.b.c/xyz.html) to be transmitted to the TV set 104 (SEQ 402).

Also, to turn over session information to the TV set 104 through the one-time URL, the Web server 105 temporarily stores this one-time URL and the session information as a pair (SEQ 403).

Subsequently, the Web server 105 transmits, to the portable device 103, a response to the HTTP GET request using the generated one-time URL as a message body (SEQ 404).

The portable device 103 extracts the one-time URL from the message body of the response received from the Web server 105 and holds it (SEQ 405). After that, the portable device 103 transmits the one-time URL to the TV set 104 by DLNA push and activates a Web browser on the TV set 104.

A system of the DLNA guideline is installed in the information communication system 100 according to the present embodiment, the portable device 103 serves as a DMS to distribute a URL and as a DMC to transmit content, and the TV set 104 serves as a DMR (as described above). Here, in the URL transmission from the portable device 103 to the TV set 104, a DLNA renderer is expanded and used so as to identify "mimetypr:text/html."

Figure 5:
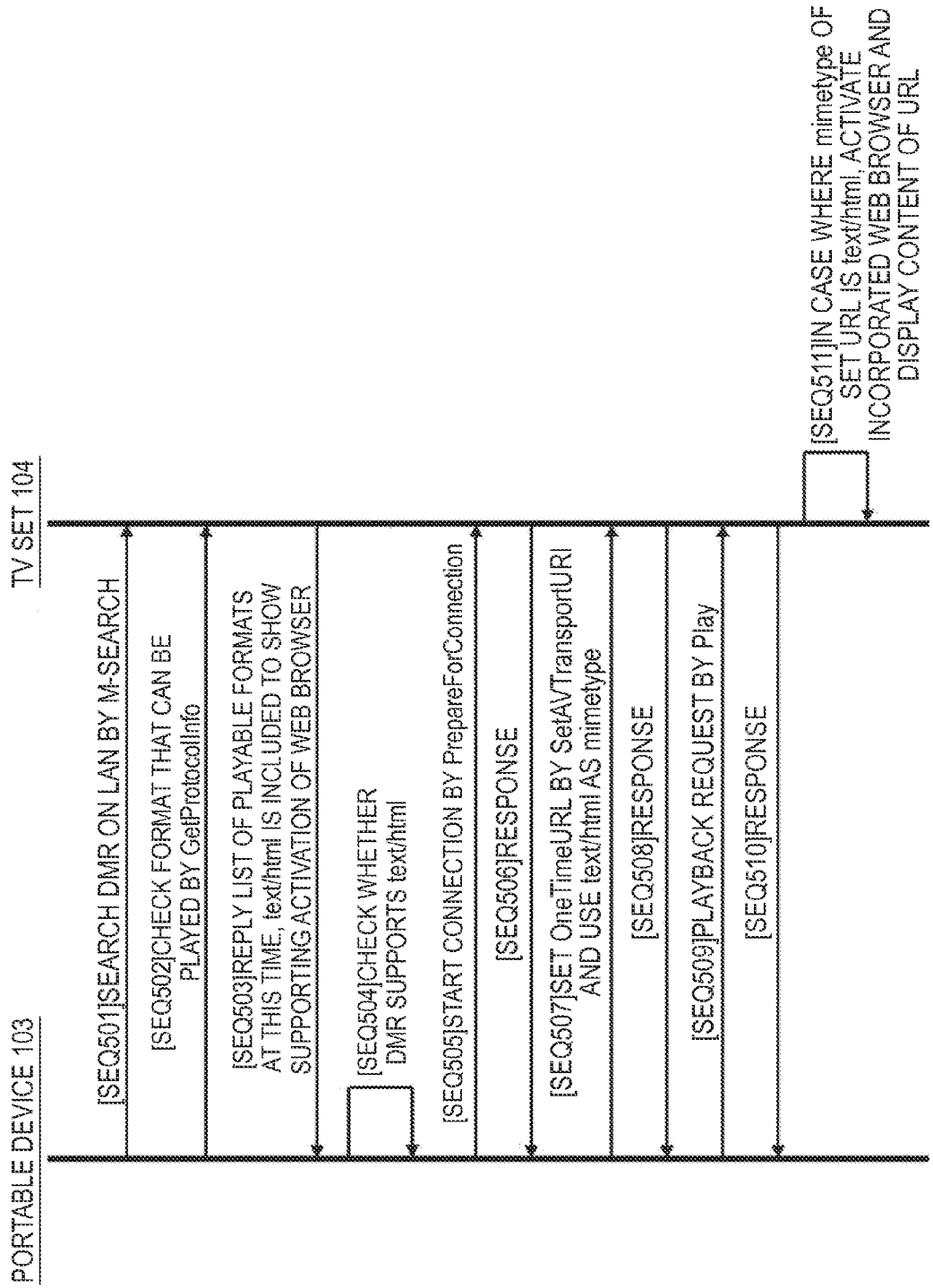
FIG. 5 is a diagram illustrating a communication sequence example where a Web browser is activated on the side of the TV set 104 by DLNA push from the portable device 103.

FIG. 5 illustrates a communication sequence example where, by DLNA push from the portable device 103 serving as the DMS and the DMC, a Web browser is activated on the side of the TV set 104 serving as the DMR.

The portable device 103 serving as the DMS and the DMC multicasts an M-SEARCH message using "urn:schemas-upnp-org:device:MediaRenderer:1" as an ST (Search Target) and waits for a response from the DMR on the LAN 101 (SEQ 501).

The TV set 104 serves as the DMR and therefore responses to the M-SEARCH message from the portable device 103.

The portable device 103 transmits a GetProtocolInfo message to check whether there is "text/html" in formats that can be played by the TV set 104 responding to the M-SEARCH message (SEQ 502). That is, the portable device 103 checks whether a URL to be subjected to DLNA push can be displayed by the TV set 104.

In response to "GetProtocolInfo," the TV set 104 replies a list of protocols/formats that can be played by the apparatus (SEQ 503). At that time, "text/html" is included in the list to show that the TV set 104 supports activation of the Web browser.

When finding from the received list that the TV set 104 supports "text/html" (SEQ 504), the portable device 103 subsequently transmits a PrepareForConnection message (SEQ 505) and starts connection with the TV set 104. When the TV set 104 returns a response in response to the PrepareForConnection message (SEQ 506), connection between the portable device 103 and the TV set 104 is established.

Next, the portable device 103 transmits a SetAVTransportURI message to the TV set 104 using the one-time URL acquired from the Web server 105 as "mimetype:text/html" (SEQ 507). In response to this, the TV set 104 returns a response (SEQ 508).

Subsequently, the portable device 103 transmits a Play message to the TV set 104 and requests a playback of the transmitted one-time URL (SEQ 509). The TV set 104 returns a response in response to the Play message (SEQ 510). Also, in a case where "mimetype" of the URL set by the received SetAVTransportURI message is "text/html," the TV set 104 activates the Web browser incorporated in the device and displays the URL (SEQ 511).

As described above, the Web server 105 temporarily stores the one-time URL and session information as a pair. Therefore, when the TV set 104 accesses the one-time URL, the Web server 105 can check whether the TV set 104 takes over the session information of the portable device 103, through this one-time URL.

That is, when the TV set 104 accesses the one-time URL, the Web server 105 transmits a cookie to the TV set 104 using the session information stored as one of the pair, takes that the TV set 104 requests a login by the same ID as that input on the portable device 103, and starts a login session. After that, the TV set 104 and the Web server 105 perform communication while exchanging the session information using this cookie.

Figure 6:
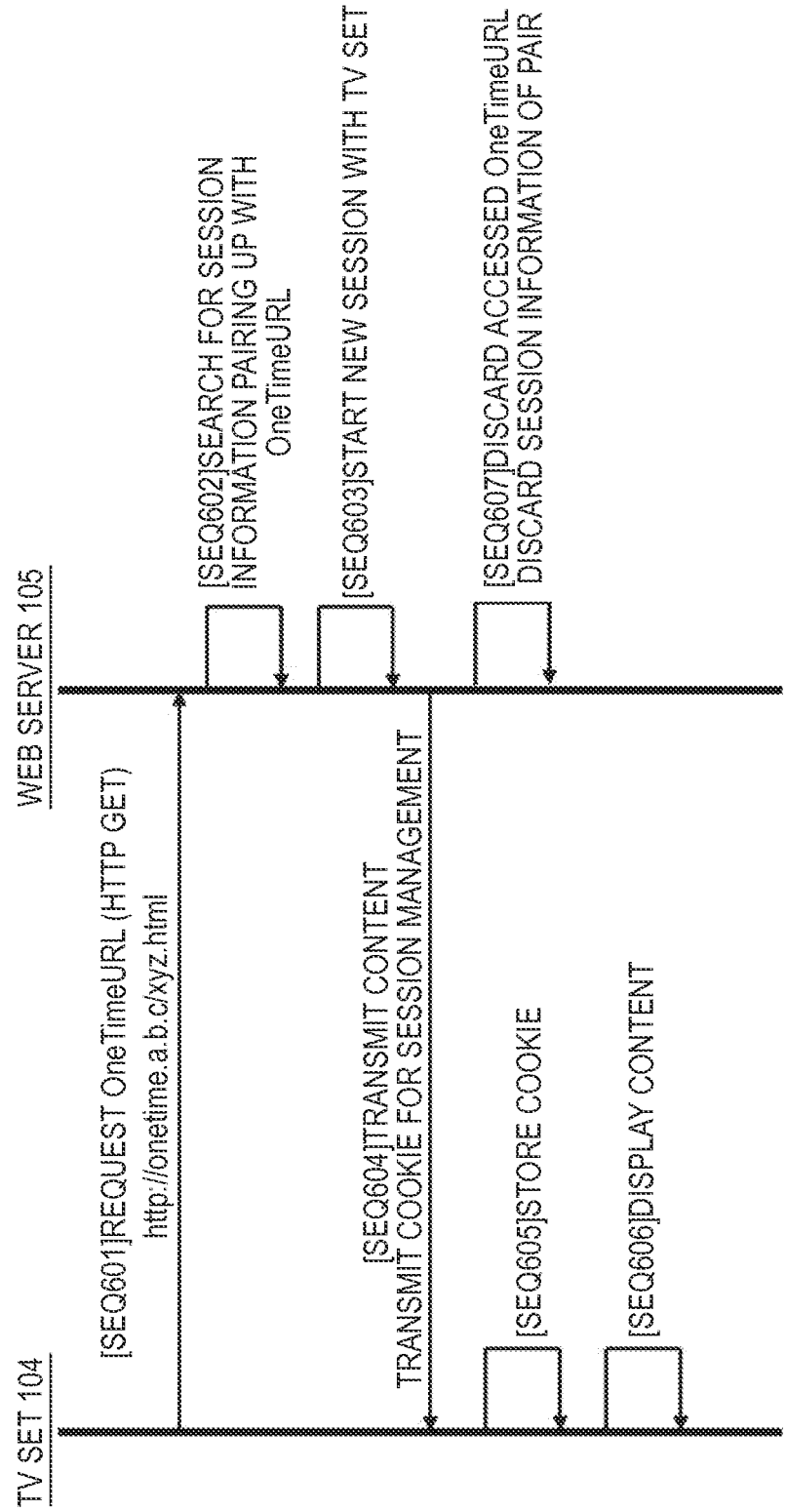
FIG. 6 is a diagram illustrating a communication sequence example where the TV set 104 accesses the Web server 105 using a one-time URL.

FIG. 6 illustrates a communication sequence example where the TV set 104 accesses the Web server 105 using a one-time URL.

The TV set 104 requests a one-time URL, which is requested to be played from the portable device 103, to the Web server 105 (SEQ 601). This request is performed using, for example, an HTTP GET message.

The Web server 105 searches for session information stored as a pair with the one-time URL accessed by the TV set 104 (SEQ 602). Subsequently, when the session information pairing up with the one-time URL is found, it is possible to recognize that the TV set 104 takes over the session information from the authorized portable device 103.

The Web server 105 newly generates a cookie to manage a login session with the TV set 104 and starts a new session with the TV set 104 (SEQ 603). Also, the Web server 105 links the generated cookie with user information and manages it.

Subsequently, the Web server 105 inserts the cookie in the header of a response to the HTTP GET message and transmits content to the TV set 104 (SEQ 604).

Here, the Web server 105 discards information of the one-type URL which the TV set 104 accessed once. Also, the Web server 105 discards the session information pairing up with the one-time URL too (SEQ 607). After that, since an error occurs if the discarded or invalidated one-time URL is accessed, it is not possible to view it if the same URL is displayed later.

The TV set 104 stores the cookie received from the Web server 105 (SEQ 605). After that, by inserting the cookie in the header part of a request to the Web server 105 and transmitting the result, the TV set 104 can deal with the Web server 105 while maintaining a connection state of the login session. Subsequently, on the side of the TV set 104, the content received by the Web browser from the Web server 105 is displayed (SEQ 606).

Thus, while using a Web service requesting authentication on the portable device 103, it is possible to display the same Web service on the Web browser incorporated in the TV set 104 without authorizing the TV set 104. The TV set 104 gets in a login state without performing an input operation of login information such as an ID and password on the Web browser.

Here, although it is not illustrated, the TV set 104 can perform the processing procedures illustrated in FIG. 3 and FIG. 4 in the same way and issue a one-time URL. Subsequently, by transferring (i.e. DLNA push) this one-time URL to other devices (e.g. DMR) on the LAN 101, the TV set 104 can further turn over the session information taken over from the portable device 103.

When there is a request to a one-time URL issue API, the Web server 105 is designed to check authentication information of the access source and deny the access in the case of an unauthorized terminal (e.g. see step S311 in FIG. 3). Therefore, even a device on the LAN 101 may not use a Web service requesting authentication unless it is in an authorized state (e.g. it is not possible to display a page requesting authentication). Also, since a one-time URL is basically transmitted in the LAN 101 (using a system of DLNA), it is difficult for a third party to intercept it.

Also, a one-time URL is generated on the side of the Web server 105, and, consequently, on the Web service side handling the Web server 105, it is possible to control conditions as to whether to generate a one-time URL and conditions such as a period of time to discard the generated one-time URL. As for Web services, it is possible to set a security level every Web service (i.e. every provided content).

Although it is possible to take over session information or authentication information through a one-time URL, it is only the Web server 105 that manages the authentication information. In other words, the portable device 103 and the TV set 104 request a one-time URL issue API to issue a one-time URL and receive URL push to activate a Web browser and take over the use of a Web service, but it is not requested to exchange authentication information with the Web server 105 and it can be realized by a simple system.

Figure 7:
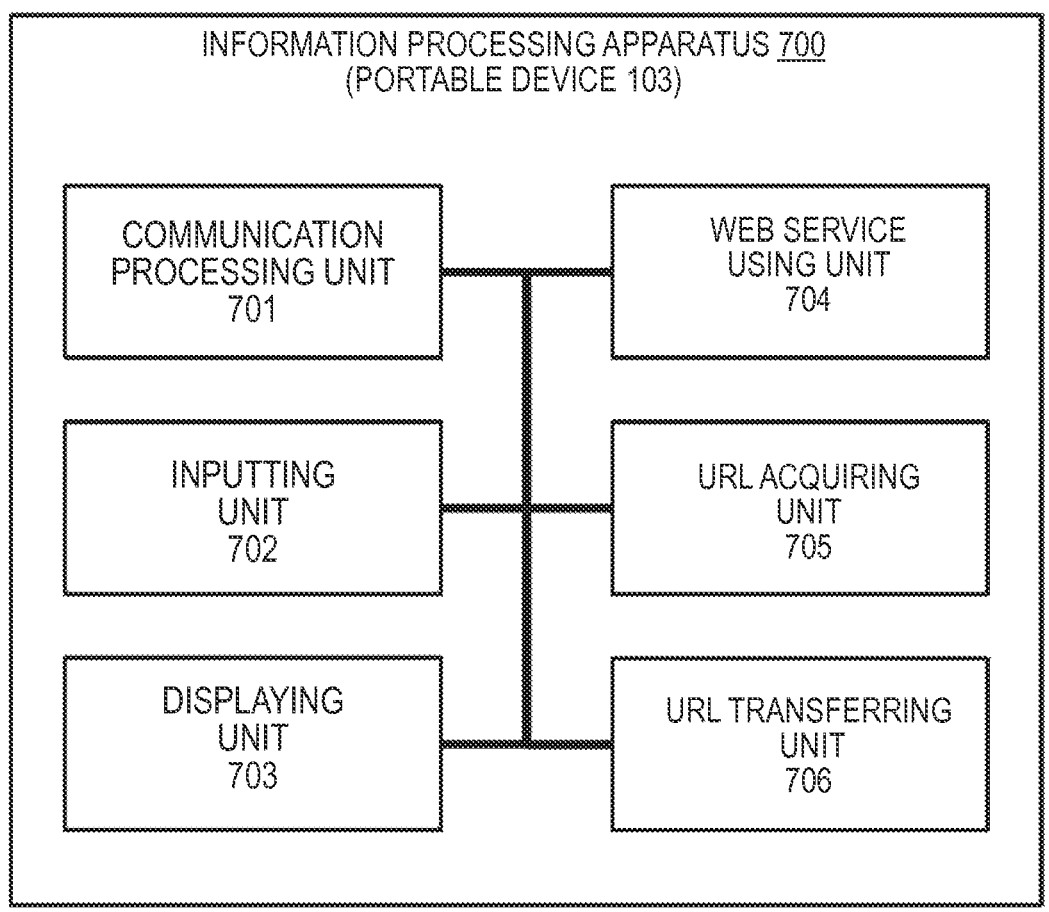
FIG. 7 is a diagram schematically illustrating a functional configuration of an information processing apparatus 700 operating as the portable device 103.

FIG. 7 schematically illustrates a functional configuration of an information processing apparatus 700 operating as the portable device 103 in the information communication system 100 according to the present embodiment. The information processing apparatus 700 illustrated in the figure includes a communication processing unit 701, an inputting unit 702, a displaying unit 703, a Web service using unit 704, a URL acquiring unit 705 and a URL transferring unit 706. However, as for function modules that are not directly related to the gist of the technique disclosed in the specification, their illustration is omitted.

The communication processing unit 701 connects to the LAN 101 and the Internet 102 and performs a communication operation as a DMC and DMS of DLNA and a communication operation as a Web client.

The Web service using unit 704 has a Web browser function, and accesses a URL input by the user through, for example, the inputting unit 702 and displays a Web service provided by the Web server 105 on the displaying unit 703. The Web service using unit 704 has a Web browser function supporting a cookie, and stores a cookie received from the Web server 105 and includes the cookie in the header of a message directed to the Web server 105.

The URL acquiring unit 705 acquires a URL to use a Web service in other devices on the LAN 101 such as the TV set 104. The URL transferring unit 706 transfers the URL acquired by the URL acquiring unit to other devices on the LAN 101 such as the TV set 104.

In the case of using a Web service requesting authentication, the Web service using unit 704 transmits, to the Web server 105, authentication information such as an ID and password input in the Web browser through the inputting unit 702 by the user. Also, the URL acquiring unit 705 acquires a one-time URL to make an access request to a Web service requesting authentication, from the Web server 105, and the URL transferring unit 706 transfers the acquired one-time URL to other devices.

Using the Web browser function, the URL acquiring unit 705 can send a query as to whether a Web service to be used by the TV set 104 requests authentication, to the Web server 105. To be more specific, the URL acquiring unit 705 transmits an HTTP HEAD request to the URL of the Web service, to the Web server 105. Subsequently, whether the Web service requests authentication is checked depending on whether a one-time URL issue requestor is included in the header of a response from the Web server 105. Also, the URL acquiring unit 705 can transmit an HTTP GET request with respect to the one-time URL issue API extracted from the header of the response from the Web server 105, and receive a one-time URL as the response.

Also, the URL transferring unit 706 serves as a DMC and DMS of DLNA and transmits a URL or one-time URL as "mimetype:text/html" to the TV set 104 serving as a DMR.

Figure 8:
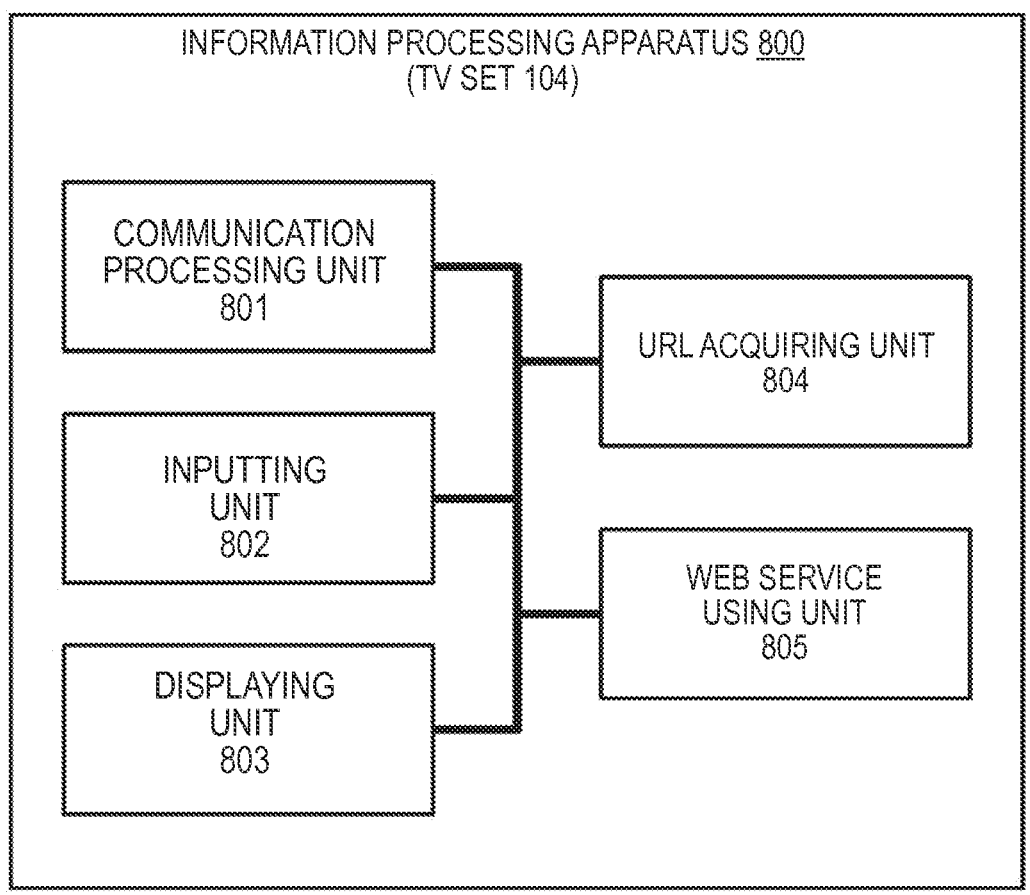
FIG. 8 is a diagram schematically illustrating a functional configuration of an information processing apparatus 800 operating as the TV set 104.

Also, FIG. 8 schematically illustrates a functional configuration of an information processing apparatus 800 operating as the TV set 104 in the information communication system 100 according to the present embodiment. The information processing apparatus 800 illustrated in the figure includes a communication processing unit 801, an inputting unit 802, a displaying unit 803, a URL acquiring unit 804 and a Web service using unit 805. However, as for function modules that are not directly related to the gist of the technique disclosed in the specification, their illustration is omitted.

The communication processing unit 801 connects to the LAN 101 and the Internet 102 and performs a communication operation as a DMR of DLNA and a communication operation as a Web client.

The URL acquiring unit 804 acquires a URL to use the same Web service from other devices such as the portable device 103. The Web service using unit 805 has a Web browser function, and makes an access request to the URL acquired by the URL acquiring unit 804 and uses a Web service provided by the Web server 105. The Web service using unit 805 has a Web browser function supporting a cookie, and stores a cookie received from the Web server 105 and includes the cookie in the header of a message to the Web server 105.

Here, in a case where a Web service to be used requests authentication, the URL acquiring unit 804 acquires a one-time URL to make an access request to the Web service from the portable device 103 and the Web service using unit 805 uses this one-time URL to use the Web service requesting authentication.

In response to reception of a URL as "mimetype:text/html" from the portable device 103 serving as a DMR of DLNA and a DMC and DMS, the URL acquiring unit 804 activates the Web browser function of the Web service using unit 805 and displays the received URL on the displaying unit 803.

Figure 9:
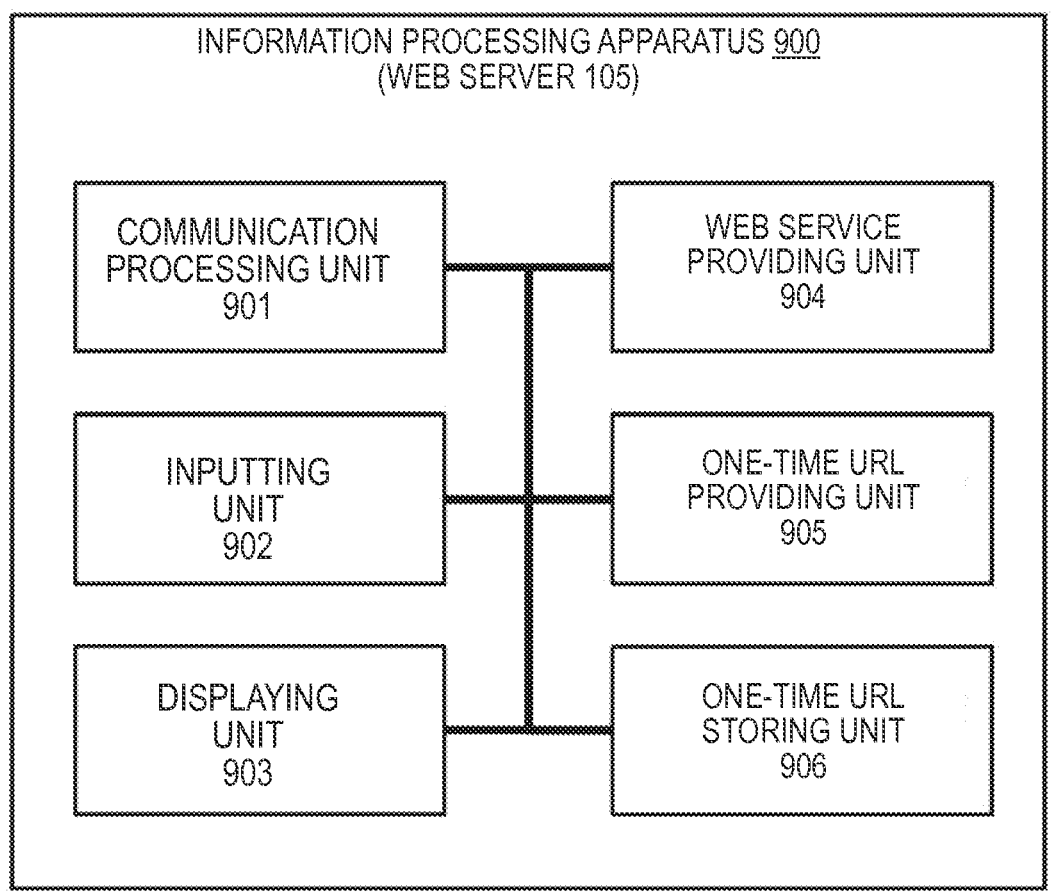
FIG. 9 is a diagram schematically illustrating a functional configuration of an information processing apparatus 900 operating as the Web server 105.

Also, FIG. 9 schematically illustrates a functional configuration of an information processing apparatus 900 operating as a Web server 105 in the information communication system 100 according to the present embodiment. The information processing apparatus 900 illustrated in the figure includes a communication processing unit 901, an inputting unit 902, a displaying unit 903, a Web service providing unit 904, a one-time URL providing unit 905 and a one-time URL storing unit 906. However, as for function modules that are not directly related to the gist of the technique disclosed in the specification, their illustration is omitted.

The communication processing unit 901 connects to the Internet 102 and performs a communication operation as a Web server.

The Web service providing unit 904 basically provides a Web service such as transmission of a corresponding Web page in response to an access request of a URL. The information communication system 100 according to the present embodiment has a feature in that the Web service providing unit 904 causes even the TV set 104 to take over an authentication state and use a Web service which is used through authentication processing in the portable device 103. Therefore, the one-time URL providing unit 905 generates a one-time URL to access the Web service requesting authentication, and transmits it to the portable device 103. Also, the one-time URL storing unit 906 stores the generated one-time URL and session information of the portable device 103 as a pair to realize a transition of the session information. Subsequently, when receiving a one-time URL from the TV set 104, the Web service providing unit 904 checks the session information stored as one of the pair in the one-time URL storing unit 906 and provides the Web service requesting authentication.

In a case where an HTTP HEAD request received from the portable device 103 or the like is an access request to a URL of a Web service requesting authentication, in response to this, the one-time URL providing unit 906 transmits a one-time URL issue requestor (see Table 1) including a one-time URL issue API and shows the request source that it is a Web service requesting information. Subsequently, when an HTTP GET request to the one-time URL issue API is received, after it is checked that it is already authorized, a one-time URL for the Web service requesting authentication is generated and transmitted as an HTTP GET response.

The Web service providing unit 904 requests an input of authentication information by the user on the Web browser incorporated in the portable device 103 when the portable device 103 accesses a Web service requesting authentication. Subsequently, if it is correctly authorized, session information is managed by a cookie.

Also, when the TV set 104 accesses the one-time URL taken over from the portable device 103, the Web service providing unit 904 takes that it logs in with the same authentication information as the portable device 103, based on session information stored as one of the pair in the one-time URL storing unit 906. At this time, the Web service providing unit 906 transmits a cookie to manage the session information, and starts a new session with the TV set 104. Subsequently, the one-time URL accessed by the TV set 104 and the session information as one of the pair are discarded by the one-time URL storing unit 906.

Additionally, the present technology may also be configured as below.

(1) An information processing apparatus including:

a Web service using unit configured to have a Web browser function supporting a cookie and use a Web service provided by a Web server;

a URL acquiring unit configured to acquire a URL to use a Web service in a different device; and a URL transferring unit configured to transfer the URL acquired by the URL acquiring unit to the different device, wherein the URL acquiring unit acquires a one-time URL to make an access request to a Web service requesting authentication, from the Web server.

(2) The information processing apparatus according to (1), further including:

an inputting unit on which a user performs an input operation of a character, wherein, at a time of using a Web service requesting authentication, the Web service using unit transmits authentication information input by the user though the inputting unit to the Web server by using the Web browser function.

(3) The information processing apparatus according to (1), wherein, by using the Web browser function, the URL acquiring unit sends a query as to whether the Web service used by the different device requests authentication, to the Web server.

(4) The information processing apparatus according to (3), wherein the URL acquiring unit transmits an HTTP HEAD request with respect to a URL of the Web service and, in a case where a one-time URL issue requestor is included in a header of a response to the HTTP HEAD request, recognizes that the Web service requests authentication.

(5) The information processing apparatus according to (4), wherein the URL acquiring unit transmits an HTTP GET request with respect to a one-time URL issue API extracted from the header of the response, and receives a one-time URL as a response to the HTTP GET request.

(6) The information processing apparatus according to (1), wherein the URL transferring unit serves as a digital media controller and a digital media server of DLNA and transmits a URL as "mimetype:text/html" to the different device serving as a digital media renderer.

(7) An information processing apparatus including:

a URL acquiring unit configured to acquire a URL to use a Web service from a different device; and a Web service using unit configured to have a Web browser function supporting a cookie, make an access request to the URL acquired by the URL acquiring unit and use a Web service provided by a Web server, wherein the URL acquiring unit acquires a one-time URL to make an access request to a Web service requesting authentication, from the different device, and wherein the Web service using unit uses the Web service requesting authentication, by using the one-time URL.

(8) The information processing apparatus according to (7), wherein, in response to reception of a URL as "mimetype:text/html" from the different device serving as a digital media controller and a digital media server, the URL acquiring unit serving as a digital media renderer of DLNA activates the Web browser function of the Web service using unit and displays the received URL.

(9) An information processing apparatus including:

a Web service providing unit configured to provide a Web service;

a one-time URL providing unit configured to generate a one-time URL to access a Web service requesting authentication, and transmit the one-time URL to a first device; and a one-time URL storing unit configured to store the one-time URL and session information of the first device as a pair, wherein, at a time of receiving a one-time URL from a second device, the Web service providing unit checks the session information stored as one of the pair in the one-time URL storing unit and provides a Web service requesting authentication.

(10) The information processing apparatus according to (9), wherein, in a case where the first device accesses a Web service requesting authentication, the Web service providing unit requests a user to input authentication information on a Web browser incorporated in the first device, and, in a case where the authentication information is correctly authorized, manages the session information by a cookie.

(11) The information processing apparatus according to (9), wherein, in a case where an HTTP HEAD request received from the first device is an access request with respect to a URL of a Web service requesting authentication, in response to this, the one-time URL providing unit transmits a one-time URL issue requestor including a one-time URL issue API and shows the first device that the URL is a Web service requesting authentication.

(12) The information processing apparatus according to (11), wherein, at a time of receiving an HTTP GET request with respect to the one-time URL issue API from the first device, the one-time URL providing unit checks that the first device is already authorized, generates a one-time URL with respect to the Web service requesting authentication, and transmits the one-time URL as a response to the HTTP GET request.

(13) The information processing apparatus according to (9), wherein, in a case where the second device accesses the one-time URL, based on the session information stored as one of the pair in the one-time URL storing unit, the Web service providing unit takes that the second device logs in with same authentication information as the first device, and transmits a cookie to manage the session information to the second device and starts a new session.

(14) The information processing apparatus according to (9), wherein the Web service providing unit discards the one-time URL accessed by the second device and the session information as one of the pair, from the one-time URL storing unit.

(15) An information processing method including:

using a Web service provided by a Web server;

acquiring a URL to use a Web service in a different device; and transferring the URL acquired in the URL acquiring step to the different device, wherein, in the URL acquiring step, a one-time URL to make an access request to a Web service requesting authentication is acquired from the Web server.

(16) An information processing method including:

acquiring a URL to use a Web service from a different device; and making an access request to the URL acquired in the URL acquiring step and using a Web service provided by a Web server, wherein, in the URL acquiring step, a one-time URL to make an access request to a Web service requesting authentication is acquired from the different device, and wherein, in the Web service using step, the Web service requesting authentication is used by using the one-time URL.

(17) An information processing method including:

providing a Web service;

generating a one-time URL to access a Web service requesting authentication, and transmitting the one-time URL to a first device; and storing the one-time URL and session information of the first device as a pair, wherein, in the Web service providing step, at a time of receiving a one-time URL from a second device, the session information stored as one of the pair in the one-time URL storing step is checked and a Web service requesting authentication is provided.

(18) A computer program written in a computer-readable format to cause a computer to function as:

a Web service using unit configured to have a Web browser function supporting a cookie and use a Web service provided by a Web server;

a URL acquiring unit configured to acquire a URL to use a Web service in a different device; and a URL transferring unit configured to transfer the URL acquired by the URL acquiring unit to the different device, wherein the URL acquiring unit acquires a one-time URL to make an access request to a Web service requesting authentication, from the Web server.

(19) A computer program written in a computer-readable format to cause a computer to function as:

a URL acquiring unit configured to acquire a URL to use a Web service from a different device; and a Web service using unit configured to have a Web browser function supporting a cookie, make an access request to the URL acquired by the URL acquiring unit and use a Web service provided by a Web server, wherein the URL acquiring unit acquires a one-time URL to make an access request to a Web service requesting authentication, from the different device, and wherein the Web service using unit uses the Web service requesting authentication, by using the one-time URL.

(20) An information communication system including:

a first device having a web browser function;

a second device having a web browser function; and a Web server providing a Web service in a case where a URL is accessed, wherein the Web server issues a one-time URL to access a Web service requesting authentication, to an authorized device, and stores the one-time URL and session information of the device as a pair, wherein the first device transmits authentication information to the Web server through the Web browser function, acquires the one-time URL, and transfers the one-time URL to the second device, and wherein the second device accesses the Web service requesting authentication by the received one-time URL.

The technique disclosed in the specification has been explained in detail with reference to the specific embodiment. However, it is clear that the embodiment can be amended or substituted by those skilled in the art without departing from the gist of the technique disclosed in the specification.

In the specification, although an explanation has been mainly given to the embodiment in which the identical Web service is used between devices on a LAN using the system of the DLNA guideline, the gist of the technique disclosed in the specification is not limited to a specific guideline. The technique disclosed in the specification is also applicable to a case where the identical Web service is used between multiple devices on a LAN not using the DLNA guideline or the identical Web service is used between multiple devices on a wide area network such as the Internet instead of the LAN.

In short, the technique disclosed in the specification has been explained in a format of exemplification, and the description content of the specification should not be limitedly interpreted. To decide the gist of the technique disclosed in the specification, the claims should be referred to.

The present disclosure contains subject matter related to that disclosed in Japanese Priority Patent Application JP 2012-146120 filed in the Japan Patent Office on Jun. 28, 2012, the entire content of which is hereby incorporated by reference.

What is claimed is:

1. An information processing apparatus, comprising:
processing circuitry configured to:
  transmit an HTTP HEAD request to a Web server, the HTTP HEAD request for a URL of a Web service to be accessed by an external device separate from the information processing apparatus;
  receive a response, from the Web server, including a header that indicates a character string of an application programming interface (API) to request issuance of a one-time URL;
  determine whether the header of the response further includes a value that indicates a request to issue a one-time URL;
  transmit, when the response is determined to include the value, an HTTP GET request to the Web server, the HTTP GET request including a cookie that indicates an authentication state of the information processing apparatus;
  receive the one-time URL from the Web server when the Web server determines, according to the cookie included in the HTTP GET request, that the information processing apparatus is authorized; and
  transmit the one-time URL to the external device, wherein the external device uses the one-time URL to access the Web service.

2. The information processing apparatus according to claim 1, wherein the processing circuitry is configured to receive an input operation of a character, and transmit authentication information input by a user to the Web server.

3. The information processing apparatus according to claim 1, wherein the processing circuitry is configured to send a query, to the Web server, as to whether the Web service requests authentication of the external device.

4. The information processing apparatus according to claim 1, wherein the processing circuitry is configured to recognize that the Web service requests authentication when the header of the response includes the value.

5. The information processing apparatus according to claim 4, wherein the processing circuitry is configured to transmit the HTTP GET request with respect to the API, the API having been extracted from the header of the response, and receive the one-time URL as a response to the HTTP GET request.

6. The information processing apparatus according to claim 1, wherein the processing circuitry is configured to serve as a digital media controller and a digital media server of DLNA to the external device, and transmit the one-time URL as "mimetype:text/html" to the external device, the external device serving as a digital media renderer.

7. An information processing apparatus, comprising:
processing circuitry configured to:
  receive an HTTP HEAD request from a first device, the HTTP HEAD request for a URL of a Web service to be accessed by a second device separate from the first device;
  transmit a response, to the first device, including a header that indicates a character string of an application programming interface (API) to request issuance of a one-time URL;

receive an HTTP GET request, from the first device, that includes a cookie that indicates an authentication state of the first device;

determine, according to the cookie included in the HTTP GET request, whether the first device is authorized to access the Web service;

generate the one-time URL to access the Web service when the first device is determined to be authorized to access the Web service;

transmit the one-time URL to the first device;

store the one-time URL and session information of the first device as a pair; and check the stored session information and provide the Web service with authentication to allow the second device to access the Web service after reception of a request, from the second device, to access the Web service via the one-time URL.

8. The information processing apparatus according to claim 7, wherein when the first device accesses the Web service and the Web service requests authentication, the processing circuitry is configured to request a user to input authentication information on a Web browser of the first device.

9. The information processing apparatus according to claim 7, wherein when the HTTP HEAD request is an access request with respect to the URL of the Web service and the Web service requests authentication, the processing circuitry is configured to generate the response to include the header including the character string.

10. The information processing apparatus according to claim 9, wherein the processing circuitry checks that the first device is authorized based on the cookie included in the HTTP GET request, generates the one-time URL with respect to the Web service requesting authentication, and transmits the one-time URL to the first device as a response to the HTTP GET request.

11. The information processing apparatus according to claim 7, wherein when the second device accesses the one-time URL, the processing circuitry is configured to, based on the stored session information, transmit a cookie to the second device, the cookie used to manage the session information and to start a new session with the Web service.

12. The information processing apparatus according to claim 7, wherein the processing circuitry is configured to discard the one-time URL accessed by the second device and the stored session information.

13. An information processing method, comprising:
transmitting, by processing circuitry of an information processing apparatus, an HTTP HEAD request to a Web server, the HTTP HEAD request for a URL of a Web service to be accessed by an external device separate from the information processing apparatus;

receiving a response, from the Web server, including a header that indicates a character string of an application programming interface (API) to request issuance of a one-time URL;

determining, by the processing circuitry, whether the header of the response further includes a value that indicates a request to issue a one-time URL;

transmitting, by the processing circuitry when the response is determined to include the value, an HTTP GET request to the Web server, the HTTP GET request including a cookie that indicates an authentication state of the information processing apparatus;

receiving the one-time URL from the Web server when the Web server determines, according to the cookie included in the HTTP GET request, that the information processing apparatus is authorized; and transmitting, by the processing circuitry, the one-time URL to the external device, wherein the external device uses the one-time URL to access the Web service.

14. An information processing method, comprising:
receiving, by processing circuitry of a Web server, an HTTP HEAD request from a first device, the HTTP HEAD request for a URL of a Web service to be accessed by a second device separate from the first device;

transmitting a response, to the first device, including a header that indicates a character string of an application programming interface (API) to request issuance of a one-time URL;

receiving an HTTP GET request, from the first device, that includes a cookie that indicates an authentication state of the first device;

determining, by the processing circuitry according to the cookie included in the HTTP GET request, whether the first device is authorized to access the Web service;

generating the one-time URL to access the Web service when the first device is determined to be authorized to access the Web service;

transmitting the one-time URL to the first device;

storing the one-time URL and session information of the first device as a pair; and checking the stored session information and providing the Web service with authentication to allow the second device to access the Web service after reception of a request, from the second device, to access the Web service via the one-time URL.

15. A non-transitory computer-readable storage medium storing computer-executable instructions that, when executed by processing circuitry of a computer, cause the computer to perform steps comprising:
transmitting an HTTP HEAD request to a Web server, the HTTP HEAD request for a URL of a Web service to be accessed by an external device separate from the computer;

receiving a response, from the Web server, including a header that indicates a character string of an application programming interface (API) to request issuance of a one-time URL;

determining whether the header of the response further includes a value that indicates a request to issue a one-time URL;

transmitting, when the response is determined to include the value, an HTTP GET request to the Web server, the HTTP GET request including a cookie that indicates an authentication state of the computer;

receiving the one-time URL from the Web server when the Web server determines, according to the cookie included in the HTTP GET request, that the computer is authorized; and transmitting the one-time URL to the external device, wherein the external device uses the one-time URL to access the Web service.

16. A non-transitory computer-readable storage medium storing computer-executable instructions that, when executed by processing circuitry of a computer, cause the computer to perform steps comprising:
receiving an HTTP HEAD request from a first device, the HTTP HEAD request for a URL of a Web service to be accessed by a second device separate from the first device;

transmitting a response, to the first device, including a header that indicates a character string of an application programming interface (API) to request issuance of a one-time URL;
receiving an HTTP GET request, from the first device, that includes a cookie that indicates an authentication state of the first device;
determining, according to the cookie included in the HTTP GET request, whether the first device is authorized to access the Web service;
generating the one-time URL to access the Web service when the first device is determined to be authorized to access the Web service;
transmitting the one-time URL to the first device;
storing the one-time URL and session information of the first device as a pair; and
checking the stored session information and providing the Web service with authentication to allow the second device to access the Web service after reception of a request, from the second device, to access the Web service via the one-time URL.

* * * * *